United States Patent
Allen

(10) Patent No.: US 9,705,755 B1
(45) Date of Patent: Jul. 11, 2017

(54) APPLICATION DEFINITION DEPLOYMENT WITH REQUEST FILTERS EMPLOYING BASE GROUPS

(71) Applicant: Amazon Technologies, Inc., Reno, NV (US)

(72) Inventor: Nicholas Alexander Allen, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 541 days.

(21) Appl. No.: 13/966,975

(22) Filed: Aug. 14, 2013

(51) Int. Cl.
*G06F 15/173* (2006.01)
*H04L 12/24* (2006.01)

(52) U.S. Cl.
CPC .................. *H04L 41/50* (2013.01)

(58) Field of Classification Search
CPC ... G06F 9/546; G06F 2209/548; G06Q 10/06; H04L 49/90; H04L 67/10
USPC .......... 709/201, 202, 203, 224, 226
See application file for complete search history.

(56) References Cited

U.S. PATENT DOCUMENTS

| | | | |
|---|---|---|---|
| 5,555,385 A | 9/1996 | Osisek | |
| 5,887,168 A | 3/1999 | Bahls et al. | |
| 6,678,735 B1 | 1/2004 | Orton et al. | |
| 6,957,113 B1* | 10/2005 | Logsdon | G05B 19/41865 700/100 |
| 7,340,679 B2* | 3/2008 | Botscheck | G06Q 10/06311 705/7.13 |
| 8,171,495 B2 | 5/2012 | Allen et al. | |
| 8,301,706 B2 | 10/2012 | Paramasivam et al. | |
| 8,375,095 B2 | 2/2013 | Yurkovich et al. | |
| 2002/0116205 A1* | 8/2002 | Ankireddipally | G06Q 20/00 705/26.1 |
| 2002/0141404 A1 | 10/2002 | Wengrovitz | |
| 2003/0093499 A1* | 5/2003 | Messinger | G06F 9/5038 709/219 |
| 2003/0154112 A1* | 8/2003 | Neiman | G06F 9/5044 705/5 |
| 2003/0236848 A1* | 12/2003 | Neiman | G06F 9/505 709/213 |
| 2003/0237084 A1* | 12/2003 | Neiman | G06F 9/5038 718/102 |
| 2004/0015968 A1* | 1/2004 | Neiman | G06F 9/4843 718/100 |
| 2004/0205776 A1 | 10/2004 | Harrington et al. | |

(Continued)

OTHER PUBLICATIONS

"The Haskell Lightweight Virtual Machine (HaLVM): GHC running on Xen." 2013.675 Pgs., GitHub, Inc., USA, https:I/github.com/GaloisInc/HaLVM.

(Continued)

*Primary Examiner* — Davoud Zand
(74) *Attorney, Agent, or Firm* — Davis Wright Tremaine LLP

(57) ABSTRACT

A method and apparatus for application definition deployment using base groups are provided. In the method and apparatus, service requests are received at a request queue and queued by the request queue. The request queue also receives an availability message from a fleet device indicating application definitions available to the fleet device using base groups. The request queue provides a service request to the fleet device, whereby the service request is identified based on the base groups indicated by the fleet device.

24 Claims, 10 Drawing Sheets

(56) References Cited

U.S. PATENT DOCUMENTS

| | | | |
|---|---|---|---|
| 2005/0060237 | A1 | 3/2005 | Barsness et al. |
| 2006/0155894 | A1* | 7/2006 | Pennington ............. G06F 9/546 710/52 |
| 2007/0124363 | A1 | 5/2007 | Lurie et al. |
| 2007/0250335 | A1* | 10/2007 | Hodges ................. G06Q 10/06 705/7.27 |
| 2009/0077011 | A1* | 3/2009 | Natarajan ......... G06F 17/30501 |
| 2009/0133036 | A1 | 5/2009 | Allen et al. |
| 2009/0133037 | A1 | 5/2009 | Allen et al. |
| 2009/0199208 | A1 | 8/2009 | Pinto et al. |
| 2009/0228329 | A1* | 9/2009 | Asanuma ......... G06Q 10/06311 705/7.13 |
| 2009/0288084 | A1 | 11/2009 | Astete et al. |
| 2010/0107177 | A1 | 4/2010 | Pinto et al. |
| 2010/0191705 | A1 | 7/2010 | Barabas et al. |
| 2010/0211946 | A1 | 8/2010 | Elzur |
| 2010/0268764 | A1 | 10/2010 | Wee et al. |
| 2011/0004701 | A1* | 1/2011 | Panda ..................... G06F 9/547 709/242 |
| 2011/0153999 | A1 | 6/2011 | Borin et al. |
| 2012/0060165 | A1* | 3/2012 | Clarke ................. G06F 9/5038 718/104 |
| 2012/0144232 | A1 | 6/2012 | Griffith et al. |
| 2012/0233282 | A1 | 9/2012 | Voccio et al. |
| 2012/0260250 | A1 | 10/2012 | Maeda et al. |
| 2013/0067469 | A1 | 3/2013 | Das et al. |
| 2013/0145362 | A1 | 6/2013 | Dawson et al. |
| 2013/0198743 | A1 | 8/2013 | Kruglick |
| 2013/0275948 | A1 | 10/2013 | Bates et al. |
| 2013/0283266 | A1 | 10/2013 | Baset et al. |

OTHER PUBLICATIONS

"Mirage: A Could Operating System," 2009-2011, 54 Pgs., Anil Madhavapeddy, USA, http://www.openmirage.org/.

"Erlang on Xen," 2011, 24 Pgs., USA, http://erlangonxen.org/.

Erlang, "Erlang on Xen—at the heart of super-elastic clouds," retrieved Jul. 16, 2015, from http://erlangonxen.org/case/a-personal-facebook, 48 pages.

Haskell, "The Haskell Lightweight Virtual Machine (HaLVM):GHC Running on Xen," GitHub, Inc., USA, retrieved Jul. 16, 2015, from https://github.com/GaloisInc/HaLVM, 100 pages.

International Search Report and Written Opinion mailed Nov. 12, 2014, International Patent Application No. PCT/US2014/050597, filed Aug. 11, 2014.

Madhavapeddy et al., "Mirage OS 1.0," released Dec. 2013, followed by Mirage OS in Jul. 2014, retrieved on Jul. 16, 2015, from https://mirage.io/, 184 pages.

Wick, "The HaLVM: A Simple Platform for Simple Platforms," XenSummit, Aug. 27, 2012, 22 pages.

Madhavapeddy et al., "Unikernels: Library Operating Systems for the Cloud," ACM SIGPLAN Notices, Apr. 23, 2013, p. 461, retrieved from the internet on Feb. 2, 2017, at http://anil.recoil.org/papers/2013-asplos-mirage. pdf, 12 pages.

Tichy, "A Catalogue of General-Purpose Software Design Patterns," Technology of Object-Oriented Languages and Systems, IEEE, Jul. 28, 1997, pp. 330-339.

Zhao et al., "Reducing the Delay and Power Consumption of Web Browsing on Smartphones in 3G networks," 2011 31st International Conference on Distributed Computing Systems, IEEE, Jun. 20, 2011, pp. 413-422.

\* cited by examiner

APPLICATION DEFINITION DEPLOYMENT WITH REQUEST FILTERS EMPLOYING BASE GROUPS

CROSS REFERENCE TO RELATED APPLICATIONS

This application incorporates by reference for all purposes the full disclosure of U.S. patent application Ser. No. 13/964,977, entitled "PER REQUEST COMPUTER SYSTEM INSTANCES" filed on Aug. 12, 2013, U.S. patent application Ser. No. 13/964,889, entitled "REQUEST PROCESSING TECHNIQUES" filed on Aug. 12, 2013 and U.S. patent application Ser. No. 13/964,941, entitled "APPLICATION BOOT IMAGE" filed on Aug. 12, 2013.

BACKGROUND

The use of remote program execution, such as running virtual computer systems (virtual machines) on behalf of customers, and storage services has proliferated in recent years. The resources for remote program execution and storage are often provided by computing resource providers who leverage large-scale networks of computers, servers and storage drives to enable clients, including content providers, online merchants and the like, to host and execute a variety of applications and web services. The content providers and online merchants, who traditionally used on-site servers and storage equipment to host their websites and store and stream content to their customers, often forego on-site hosting and storage and turn to using the resources of the computing resource providers. Remote program execution and storage services allows content providers and online merchants, among others, to efficiently and adaptively satisfy their computing needs, whereby the computing and storage resources used by the content providers and online merchants are added or removed from a large pool provided by a computing resource provider as needed and depending on their needs.

It is often important for customers and users to be able to update the application definitions used to perform remote program execution. Updating the application definitions may often necessitate pushing the updated application definitions to a large fleet of devices, whereby it is advantageous to update the application definitions of the fleet of devices in an efficient manner.

BRIEF DESCRIPTION OF THE DRAWINGS

Various embodiments in accordance with the present disclosure will be described with reference to the drawings, in which.

DETAILED DESCRIPTION

Figure 1:
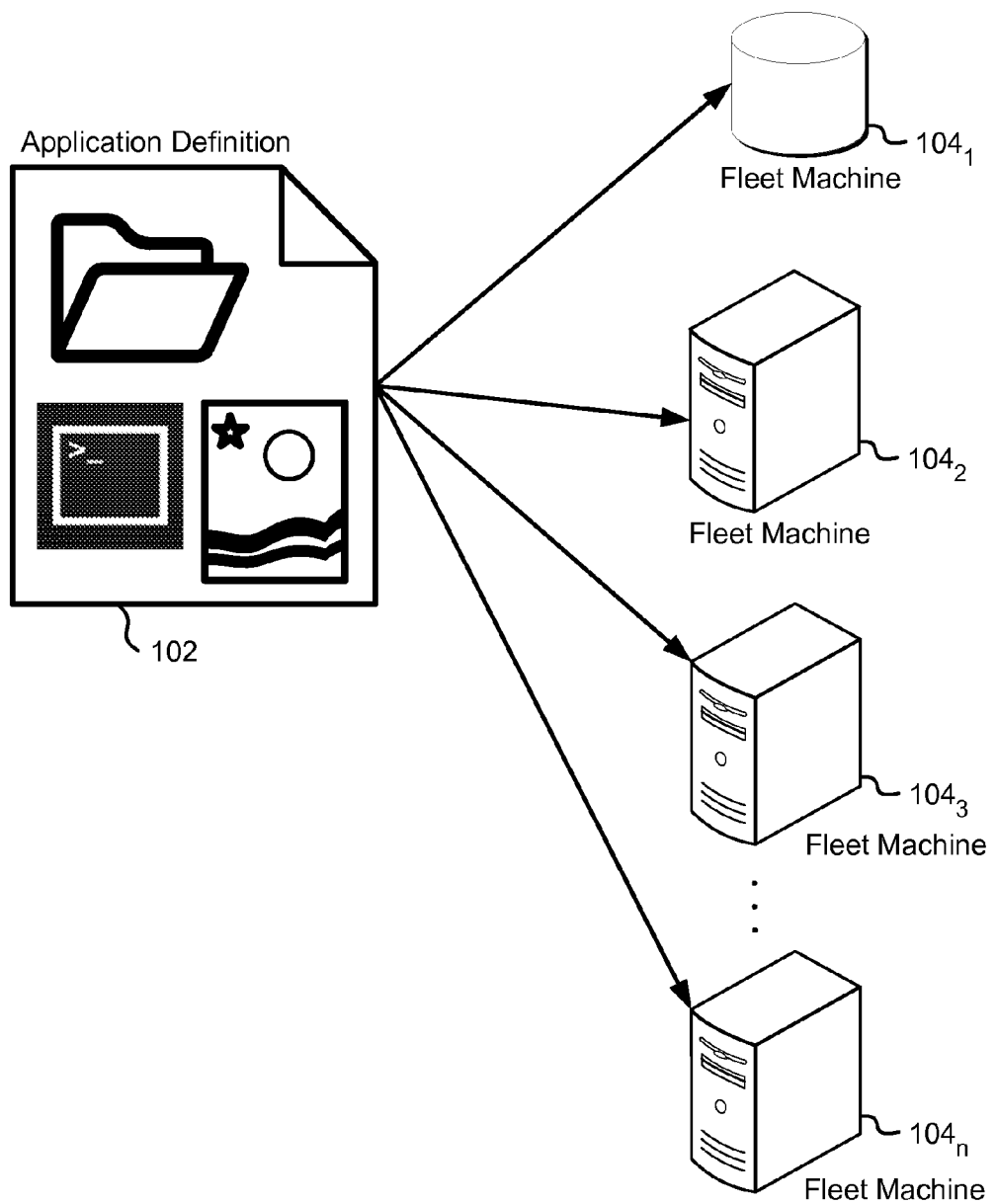
FIG. 1 illustrates application definition distribution to a fleet of devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include deploying application definitions to fleet machines using request filters. To deploy an application definition to a fleet machine, a deployment system notifies the fleet machine of the availability of an application definition and an available application definition may be retrieved by the fleet machine from an application definition repository. The application definition may be used by the fleet machine to service or process service requests that are received from a user or a customer. The application definition may include executable code and/or static data. Examples include static resource files, such as images, style sheets, video files, binary text files, and/or executable code which may include source code and/or complied source code. The application definition may be built or constructed using any application definition building method or technique, such as those described with reference to U.S. patent application Ser. No. 13/964,941, entitled "APPLICATION BOOT IMAGE" filed on Aug. 12, 2013, the contents of which are hereby incorporated by reference herein as if fully set forth. Further, the service request may be any request, such as a hypertext transfer protocol (HTTP) request.

The deployment system may create a base group specifying a plurality of application definitions. The base group may be used for compactly specifying the plurality of application definitions, whereby, for example, a base group denoted as G1 may specify six application definitions denoted as A-F and another base group denoted as G2 may specify five application definitions denoted as C-G. The deployment system may send the definition of the base group to a base group repository, whereby the base group repository may retain the definition of the base group. The definition of the base group may include an identity associated with the base group and the identities of the application definitions that are specified by the base group. The base group is advantageous in that it results in the reduction of communication and networking overhead, whereby the identity associated with the base group may be communicated more compactly than the identities of the application definitions that are specified by the base group.

The types of service requests that may be processed or serviced by the fleet machine may be dependent upon the application definitions available to the fleet machine, whereby a service request requiring a particular application definition for processing may only be processed by a fleet machine that has access to the application definition or that is capable of retrieving the application definition. Further, the fleet machine may process service request requiring a particular application definition for processing when the fleet machine is configured with the application definition. A fleet machine may be said to be configured with the application definition if, for example, the application definition is installed on the fleet machine.

Before service requests are provided to the fleet machine, the service requests may be provided to a request queue. The request queue may store the service requests in an order substantially consistent with the order of receipt of the service requests. The request queue may prioritize allocating or assigning a service request for processing by a fleet machine based at least in part on the temporal order of receipt of the service request. The request queue may be configured to assign a service request to a fleet machine for processing only when the application definition required for processing is available to the fleet machine. To determine whether a fleet machine is configured with or has access to an application definition required for processing the service request, the request queue may be configured to receive an availability message from a fleet machine. The availability message may indicate the availability of the fleet machine to service or process service requests and may also indicate the application definitions that are available to the fleet machine. To indicate the application definitions that are available to the fleet machine, the availability message may have an associated request filter indicating the identity of application definitions available to the fleet machine. The request filter may indicate the identity of application definitions available to the fleet machine using base groups or application definition identities.

The request filter may indicate application definitions available to the fleet machine by specifying the identities of the application definitions. To lower overhead and facilitate compact communication, the request filter may utilize base groups to indicate the identity of application definitions. Further, the request filter may utilize logical operations, such as logical conjunction and logical disjunction, performed on the base groups to flexibly indicate the identities of application definitions. By way of example, a fleet machine may indicate the application definitions available to the fleet machine by providing a request filter indicating the addition of a plurality of base groups, whereby the addition may be interpreted to represent all the application definition specified by the plurality of base groups. Similarly, the subtraction of a first base group from a second base group may indicate that the available application definitions are those specified by the second base group less the application definitions specified by the first base group. In addition, the request filter may use both base groups and application definition identities to indicate application definitions that are available to the fleet machine.

The request queue may receive the request filter specifying the application definitions available to the fleet machine. The request queue may determine the application definitions required for processing each received service request. The request queue may then find a service request requiring an application definition indicated as available by the fleet machine and provide the service request to the fleet machine for processing. Upon receiving the service request, the fleet machine may retrieve an application definition required for processing the service request from the application definition repository. Alternatively, the fleet machine may retrieve the application definition from the application definition repository prior to receiving the service request (for example, upon receiving a notification from deployment system indicating a new application definition is available). The application definition repository includes local storage and the application definition may be stored in a local hard disk, hard drive or solid state drive. Further, the fleet machine may process the service request, provide an outcome, for example, to a user, and indicate to the request queue that the request has been processed. Servicing or processing the request may include instantiating a virtual host or a virtual machine, providing the application definition to the virtual host or the virtual machine and causing the virtual machine to process the request. Examples of request processing are described in U.S. patent application Ser. No. 13/964,977, entitled "PER REQUEST COMPUTER SYSTEM INSTANCES" filed on Aug. 12, 2013, the contents of which are hereby incorporated by reference herein as if fully set forth. Upon receiving an indication that the request has been processed, the request queue may delete or de-queue the service request.

It is noted that notifying the fleet machine of the availability of an application definition and retrieving the application definition by the fleet machine on a condition that the fleet machine receives a service request requiring the application definition for processing enables efficient deployment of application definitions to a fleet devices. Further, the usage of base groups to indicate available application definitions enables efficient communication and reduced networking overhead.

FIG. 1 illustrates application definition distribution to a fleet of devices. An application definition 102 is distributed to a plurality of fleet machines $104_{1-n}$ (singularly referred to hereinafter by the numeral alone). The application definition 102 may be any data or computer-executable commands. The data may include a static resource file, such as an image, style sheet, video, binary text file or database. Further, the computer-executable commands may be an application source code that is sought to be provided to the fleet machines $104_{1-n}$. A fleet machine 104 may be any computer that is equipped with a processing capability, for example, using a central processing unit (CPU), graphics processing unit (GPU), or digital signal processor (DSP), among others. Further, the fleet machine 104 may be a server that is equipped with processing capability or computational resources and configured to receive requests over a network or provide network services. The fleet machine 104 may also be a network storage device, such as a hard disk or solid state drive, or an input/output device, such as a network card or a modem. The fleet machines $104_{1-n}$ to which the application definition 102 is distributed may be networked and may exchange information between one another or a third party using any type of networking, communication or handshaking protocol. The fleet machines $104_{1-n}$ may further be configured to receive service requests from a user or customer and use the application definition 102 to process the service requests. The application definition 102 may be used to enable a fleet machine 104 to provide a service to the user or the customer, for example, based on the received service request.

The application definition 102 may also be an update to another application definition being presently used by a fleet machine 104 and it may be desirable to populate the application definition 102 to the fleet machines $104_{1-n}$ in order for the fleet machines $104_{1-n}$ to be able to process service requests in accordance with the application definition 102. It is noted that updating the fleet machines $104_{1-n}$ with the application definition 102 may be performed by sending the application definition 102 to all of the fleet machines $104_{1-n}$. However, such update may require a lengthy time to complete. Further, it is advantageous to provide the update on a per service request-basis.

Figure 2:
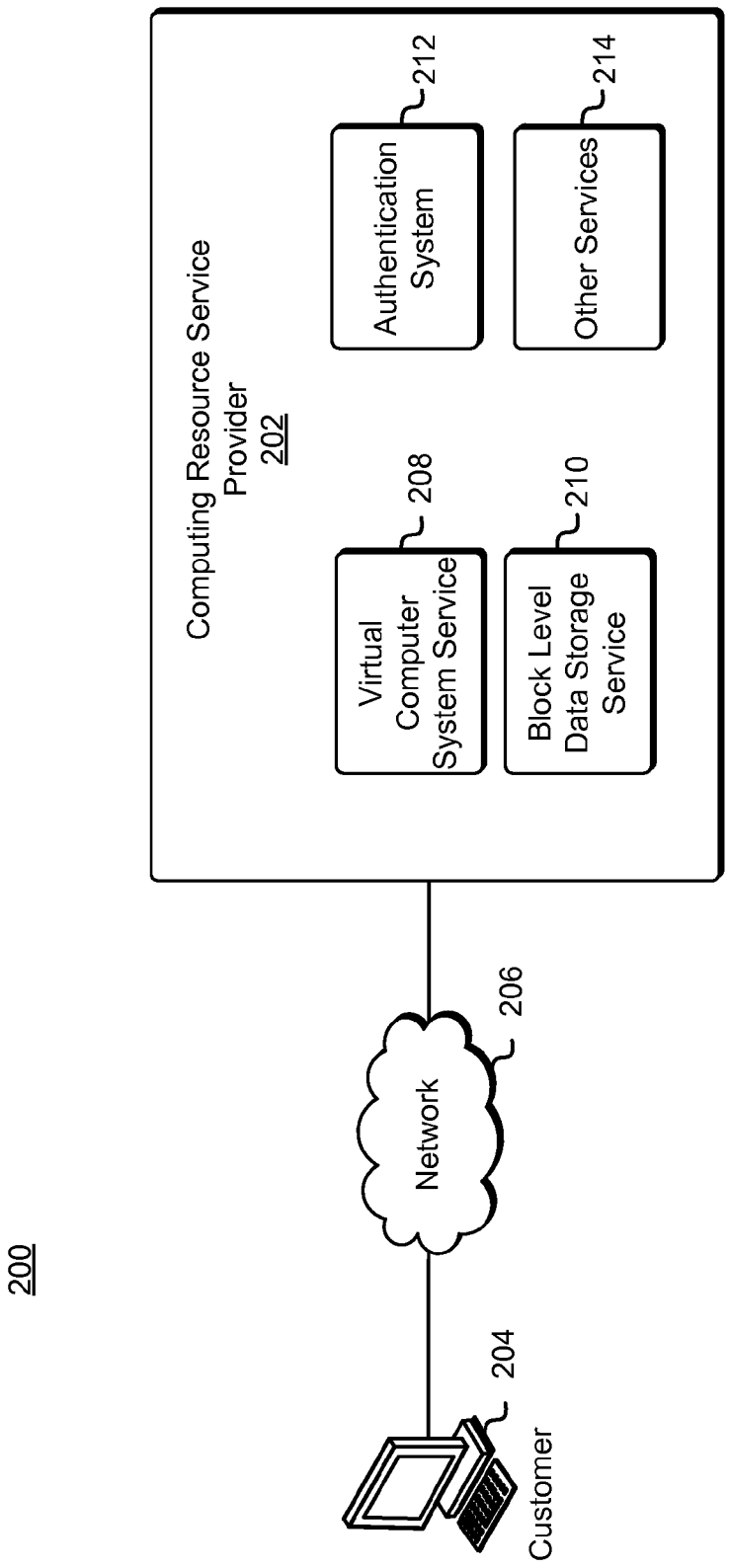
FIG. 2 shows an example of a customer connected to a computing resource service provider.

FIG. 2 shows an example of a customer connected to a computing resource service provider. The computing resource service provider 202 may provide a variety of services to a customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such the Internet, an intranet or an Internet service provider (ISP) network. Some communications from the customer 204 to the computing resource service provider 202 may cause the computing resource service provider 202 to operate in accordance with one or more embodiment described herein or a variation thereof.

The computing resource service provider 202 may provide various computing resource services to its customers. The services provided by the computing resource service provider 202, in this example, include a virtual computer system service 208, a block-level data storage service 210, an authentication system 212 and one or more other services 214. It is noted that not all embodiments described herein include the services 208-214 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from and/or access one or more block-level data storage devices provided by the block level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 may additionally maintain one or more other services 214 based at least in part on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 212. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. Other services and/or components may also be included in the environment 200. Similarly, techniques of the present disclosure apply to other environments.

A user or a developer may use the resources of the virtual computer system service 208, described with reference to FIG. 2, to perform computations, execute applications or provide service to customers and other users. For example, the user may utilize instantiated virtual computer systems that are provisioned using physical computing devices hosted and operated by the computing resource service provider 202. Although the term fleet machine is used herein to refer to the resources provisioned to provide service to the customer, a fleet machine is not limited to computing resources and may be any physical or virtual storage or networking resource that is used to provide service to a customer.

A user or a developer may seek to provide the definition of an application to be used for processing or providing service to customer request. The application definition may be an update to a presently used application definition or may be entirely new and may be sought to be propagated across or deployed to fleet machines that may potentially provide service to service requests associated with the user or developer. A deployment system may be configured to receive an application definition and notify one or more fleet machines of the availability of the application definition for usage, as described with reference to FIG. 3 and FIG. 4.

Figure 3:
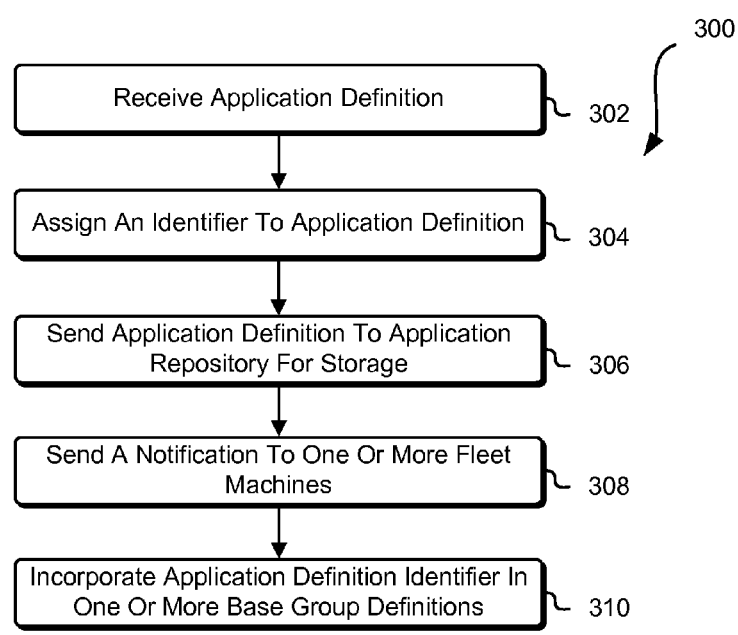
FIG. 3 depicts aspects of data centers in accordance with at least one embodiment.

FIG. 3 shows an example of application definition deployment. In the process 300, a deployment system receives 302 an application definition, for example, from a user or a developer. As described herein, the application definition 402 may be any data or computer-executable commands, whereby, for example, the application definition 402 may be any one of an application source code, resource file, machine instructions or binary computer-executable files, among others. The deployment system then assigns 304 an application definition identifier to the application definition. The application definition identifier may be used to uniquely identify the application definition. The deployment system then sends 306 the application definition to the application definition repository for storage. The application definition repository may be used to hold the application definition for usage by a fleet machine, whereby the application definition may be accessed from the application definition repository by the fleet machine. The deployment system may send the application definition identifier to the fleet machine along with the application definition in order to facilitate access to the application definition by a fleet machine.

The deployment system then sends 308 a notification of the availability of the application definition to one or more fleet machines. The notification may include the identifier associated with the application definition and may indicate to the fleet machine that the application definition is available for use. As described herein, the fleet machine may begin using the application definition to service or process received service requests from users or customers. The deployment system then incorporates 310 the application definition identifier in one or more base group definitions. As described herein, a base group facilitates compact communication between a fleet device and a request queue and may be used to indicate the application definitions that are configured available to the fleet machine. By indicating the application definitions that are available to the fleet machine, the fleet machine may be tasked with providing service or processing service requests that require the particular application definition for processing.

Figure 4:
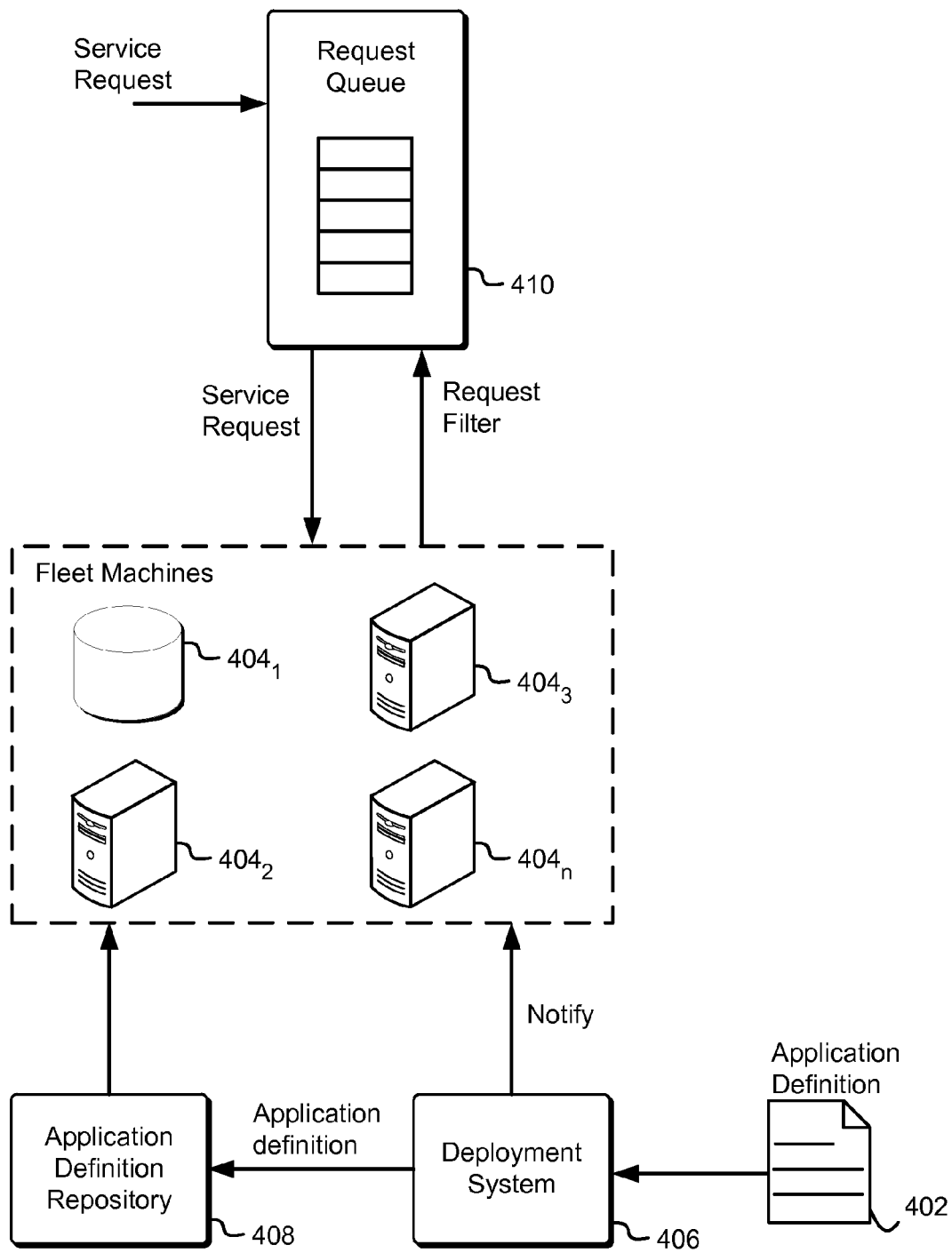
FIG. 4 shows an example of application definition deployment to a plurality of fleet machines.

FIG. 4 shows an example of application definition deployment to a plurality of fleet machines. An application definition 402 is provided to a deployment system 406 for deployment on one or more of a plurality of fleet machines $404_{1-n}$. The application definition 402 may be operable to enable one or more of the plurality of fleet machines $404_{1-n}$ to receive or process a service request from a user in accordance with the provided application definition 402. Processing the service request may cause an outcome to be provided to a user. The host $404_2$ may be a web server and the service request may be a web service request that requires an application, such as a web template, to be processed and for an outcome, such as a web page, to be provided to a user. Further, the service request may be any request, such as a hypertext transfer protocol (HTTP) request or any other request described with reference to U.S. patent application Ser. No. 13/964,889, entitled "REQUEST PROCESSING TECHNIQUES" filed on Aug. 12, 2013, the contents of which are hereby incorporated by reference herein as if fully set forth.

The deployment system 406 receives the application definition 402 and provides the application definition to an application definition repository 408. The deployment system 406 may generate an application definition identifier for the received application definition 402. The application definition identifier may be universally unique and may be used to identify the application definition. The deployment system 406 may send the application definition identifier to the application definition repository 408 and the application definition repository 408 may associate the application definition 402 with the application definition identifier and may maintain an association or a mapping between received application definitions and their associated application definition identifiers.

The application definition repository 408 stores the application definition in order for the application definition 402 to be provided to a fleet machine 404. The application definition repository 408 may include a storage device, such as a hard drive or a solid-state drive that enables holding an application definition 402 for access by a fleet machine 404. It is noted that although one application definition repository 408 is shown in FIG. 4, it is contemplated that more than one application definition repository 408 may be used to service a plurality of fleet machines $404_{1-n}$. Various associations between the fleet machines $404_{1-n}$ and an application definition repository 408 are contemplated, whereby a one-to-one type of association may exist between the application definition repository 408 and a fleet machine 404 and as such each fleet machine 404 may have a dedicated and non-shared application definition repository 408. Alternatively, a one-to-many type of association between the application definition repository 408 and the fleet machines $404_{1-n}$ may be used, whereby an application definition repository 408 may store an application definition 402 for usage by a plurality of fleet machines, such as any one of fleet machine $404_{1-n}$.

The deployment system 406 may then notify one or more of the plurality of fleet machines $404_{1-n}$ of the receipt of the application definition 402 by the deployment system 406 or the availability of the application definition 402 in the application definition repository 408. In an embodiment, the deployment system 408 may notify one or more fleet machines $404_{1-n}$ that are serviced by the application definition repository 408 of the availability of the application definition 402 in the application definition repository that services the one or more fleet machines $404_{1-n}$. The deployment system 406 may notify the one or more fleet machines $404_{1-n}$ of the presence or availability of the application definition 402 by sending a message including the application definition identifier to the one or more fleet machines $404_{1-n}$.

The application definition 402 may be used by one or more fleet machines $404_{1-n}$ to provide service to or entertain a service request from a user. For example, the application definition 402 may be an application definition required for processing the service request, a definition or source code for the application or an update to a presently used application. Further, the fleet machine may be required to be configured with the application definition and the application definition may be required to be present on a fleet machine 404 for the fleet machine to be able to provide service to or process a service request by a user. The service request may be capable of being serviced or processed by a subset of the one or more fleet machines $404_{1-n}$ or all of the one or more fleet machines $404_{1-n}$ provided that a fleet machine 404 of the subset or all of the fleet machines $404_{1-n}$ is configured with the application definition 402 needed for the service request to be processed or provided that the application definition 402 is available to the fleet machine 404. Accordingly, the application definitions available to a fleet machine 404 may dictate the types of requests the fleet machine 404 is capable of processing, whereby the fleet machine 404 may only be capable of processing service requests for which the fleet machine 404 is configured.

The fleet machine 404 indicates the types of service requests the fleet machine 404 is capable of processing by sending an availability message to a request queue 410 indicating the fleet machine's 404 availability for service request processing. The message may include a service request filter that identifies the types of service requests the fleet machine 404 is capable of processing. As described herein, the request queue 410 stores or holds incoming service requests that are destined to one or more of the plurality of fleet machines $404_{1-n}$ for processing. Further, the request queue 410 may include a queue manager that manages queue data. The request filter may be utilized by the request queue 410 to identify a service request that is to be provided to the fleet machine 404 for processing. Upon identifying the service request, the request queue 410 sends the identified service request to the fleet machine 404. The service request identified from the queue may not be the oldest (i.e., first received service request). When the fleet machine 404 is unable to process the oldest service request, a newer service request may be provided to the fleet machine 404.

The service request filter may include one or more application definition identifiers of the application definitions with which the fleet machine 404 is configured or which are available to the fleet machine 404 in the application definition repository 408 of the fleet machine. For example, the service request filter may include application definition identities A, B and C and the fleet machine 404 may be capable of processing service requests requiring any one of the application definitions whose identities are A, B or C. In lieu of or in addition to application definition identifiers, the request filter may include a base group identifier. A base group identifier is advantageous because it facilitates the compact identification of application definitions available to the fleet machine 404 and lowers networking overhead. A base group identifier identifies a group of application definitions that are available to the fleet machine, whereby, for example, a base group identified as G1 may indicate application definitions identified as D, E and F. The fleet machine 404 may identify application definitions by logically connecting base group identifiers, application definition identifiers or both a base group identifier and an application definition identifier. By way of example, the fleet machine 404 may indicate application definition identifiers A, D, E and F by the logical disjunction of application definition identifier A and base group identifier G1 as described herein. Further, any other type of logical operations performed on the base group identifiers may be used to indicate available application definitions.

Figure 5:
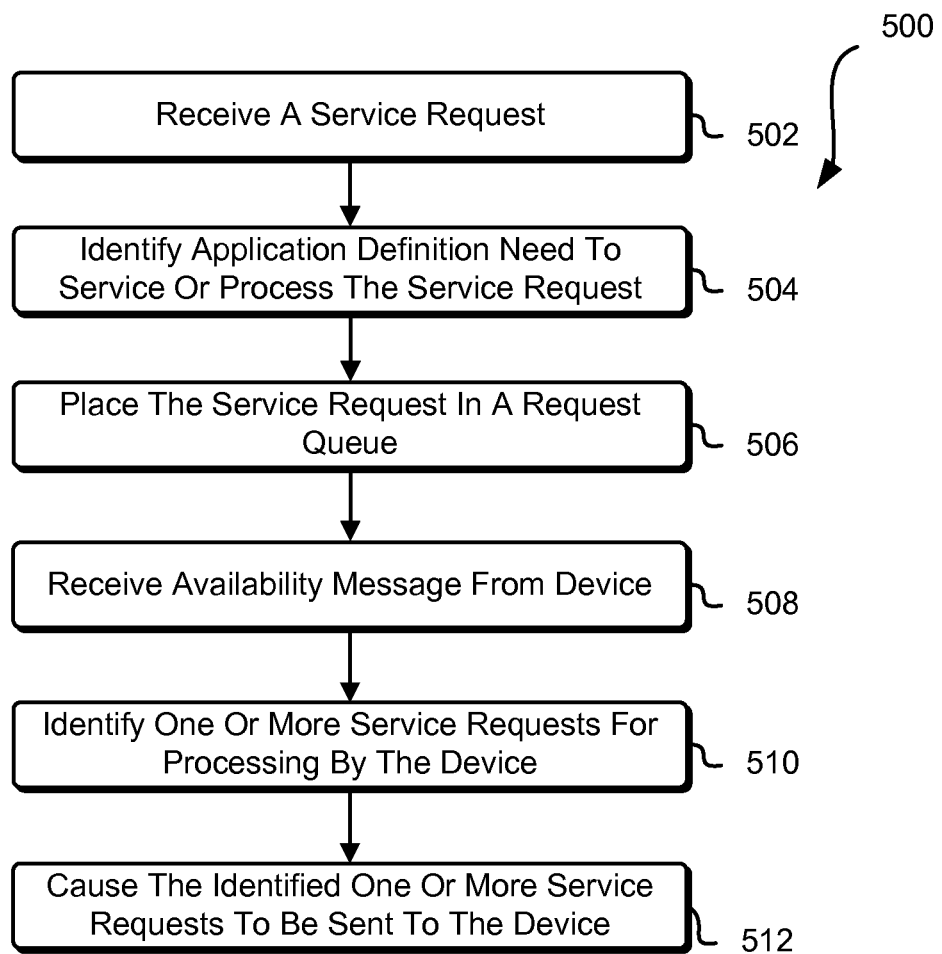
FIG. 5 shows an example of a method for processing service requests.

FIG. 5 shows an example of a method for processing service requests. In the process 500, a request queue receives 502 a service request. The service request may originate from a user or a customer and may require to be processed by a fleet machine 404 equipped with an appropriate application definition, whereby, for example, the application definition may be a computer-executable application. By way of example, the service request may be a hypertext transfer protocol (HTTP) request to view a website and may require a fleet machine 404, such as a web server, to be equipped with a particular version of an Internet protocol in order to process the request and provide the website for the user. The request queue then identifies 504 an application definition needed to service the request. The application definition may be identified based on an end point address of the service request, such as a device name, path or port, or a query parameter of the request. Further, the application definition may be identified by information present in the service request, such as an ability to select from one or more versions of the application definition for processing the service request. Additionally, the application definition may be identified based at least in part on any protocol version indicated in the service request that requires a particular application definition for processing.

The request queue then places 506 the service request in a queue to await assignment to a fleet machine 404 for handling or processing the service request. The queue may be any type of memory or buffer and the service request may be placed in the queue in order of receipt by the request queue. The request queue may maintain a metadata storage that maps or correlates a service request to the identified application definition needed for processing the service request. The request queue then receives 508 an availability message from a fleet machine indicating the availability of the fleet machine 404 to receive, process or service a service request. The availability message may include an indication of the identities of application definitions that are available to the fleet machine or with which the fleet machine is configured. As described herein, the availability message may include a request filter or a base group identifier. The request filter or base group identifier may be used to convey to the request queue the application definitions that are available to the fleet machine or the application definitions with which the fleet machine is configured.

The request queue identifies 510 one or more service requests that may be processed by the fleet machine or sent to the fleet machine. The request queue may determine whether a service request is capable of being processed by the fleet machine based at least in part on the metadata information associated with the service request, whereby a service request that is stored in the request queue may be sent to the fleet machine for processing or service on a condition that the application definition identity of the service request matches or corresponds to an application definition identity specified in the availability message. The request queue then causes 512 the one or more service requests to be sent to the fleet machine. It is noted that in alternative embodiments, the order of receipt of the service request and the availability message may be reversed, whereby the availability message may be received prior to the service request and may be satisfied upon the arrival of the service request.

As described herein the request queue may store received service requests according to their order of receipt and may assign processing priority based at least in part on the position of a service request in the queue, whereby an earlier-received request may be given processing priority over a later-received service request. For example, the top of the request queue may be populated by service request that were typically received at a time before the service requests that populate the bottom of the request queue. To facilitate providing matching a service request to a fleet machine from which an availability message is received, the request queue may also include metadata information associated with the received service requests as described with reference to FIG. 6.

Figure 6:
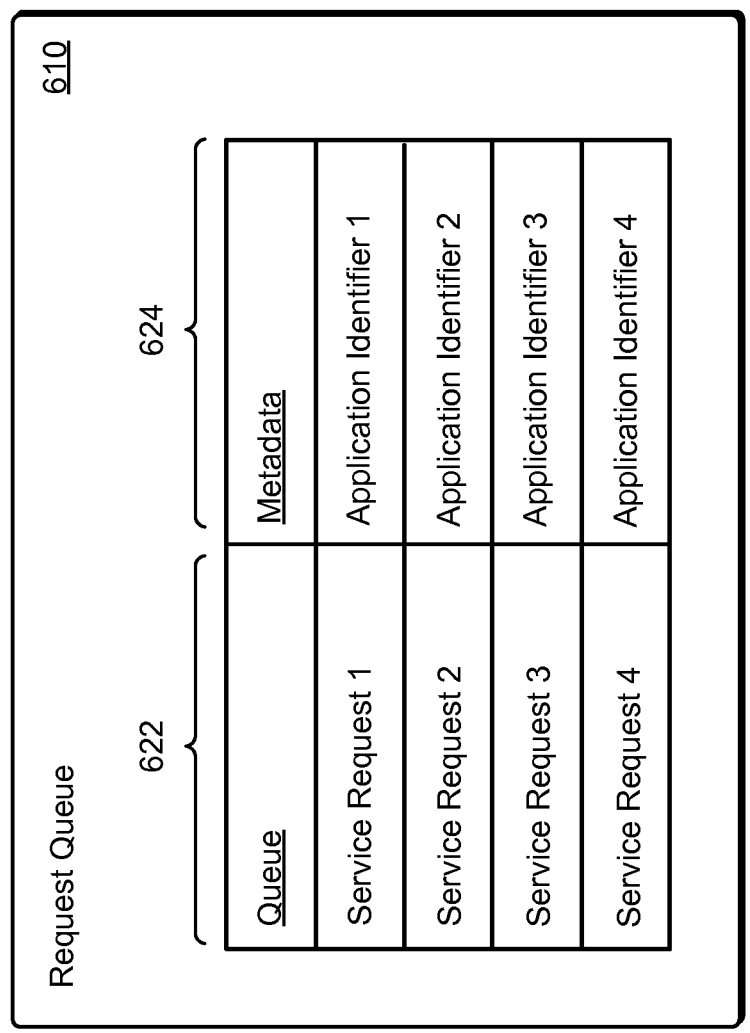
FIG. 6 shows an example of a request queue having metadata associated with received requests.

FIG. 6 shows an example of a request queue having metadata associated with received requests. The request queue 610 include a queue 622 for storing service requests and metadata 624 storage for storing information associated with the service requests. The queue 622 includes one or more received service requests, which may be ordered in the queue according to their receipt time or in a manner substantially consistent with their receipt time. The metadata 624 includes application definition identifiers that are associated with the service requests of the queue 622. Upon receiving an availability message including a request filter, the request queue or a queue manager (not shown) of the request queue may scan the metadata in an order consistent with the order of receipt of the service requests and identify a matching application definition identifier. The service request associated with the matching application definition identifier may be sent to the fleet machine and the service request may be de-queued. To de-queue a service request, the service request is removed from the queue 622 and the application definition identifier associated with the service request is also removed from the metadata 624. Limits may be imposed on the number of metadata entries that are scanned before determining whether a matching entry is found. For example, a limit of 1000 entries may be imposed on the number of scanned entries.

Alternatively, service request locking may be performed prior to de-queuing. Locking is advantageous in that it attempts to ensure that a service request is processed or serviced before the service request is de-queued. Upon matching the request filter of an availability message, a service request is locked for a predetermined period of time and the service request is de-queued only upon receipt of an indication (for example, notification) from a servicing fleet machine that the service request has been processed. If, for example, the fleet machine fails in processing the service request and the pre-determined period of time expires before the indication is received, then the service request is not de-queued and may instead be retained in the queue 622 for subsequent matching. To prevent multiple processing of the same service request, metadata scanning may bypass the service request while the service request is locked.

Figure 7:
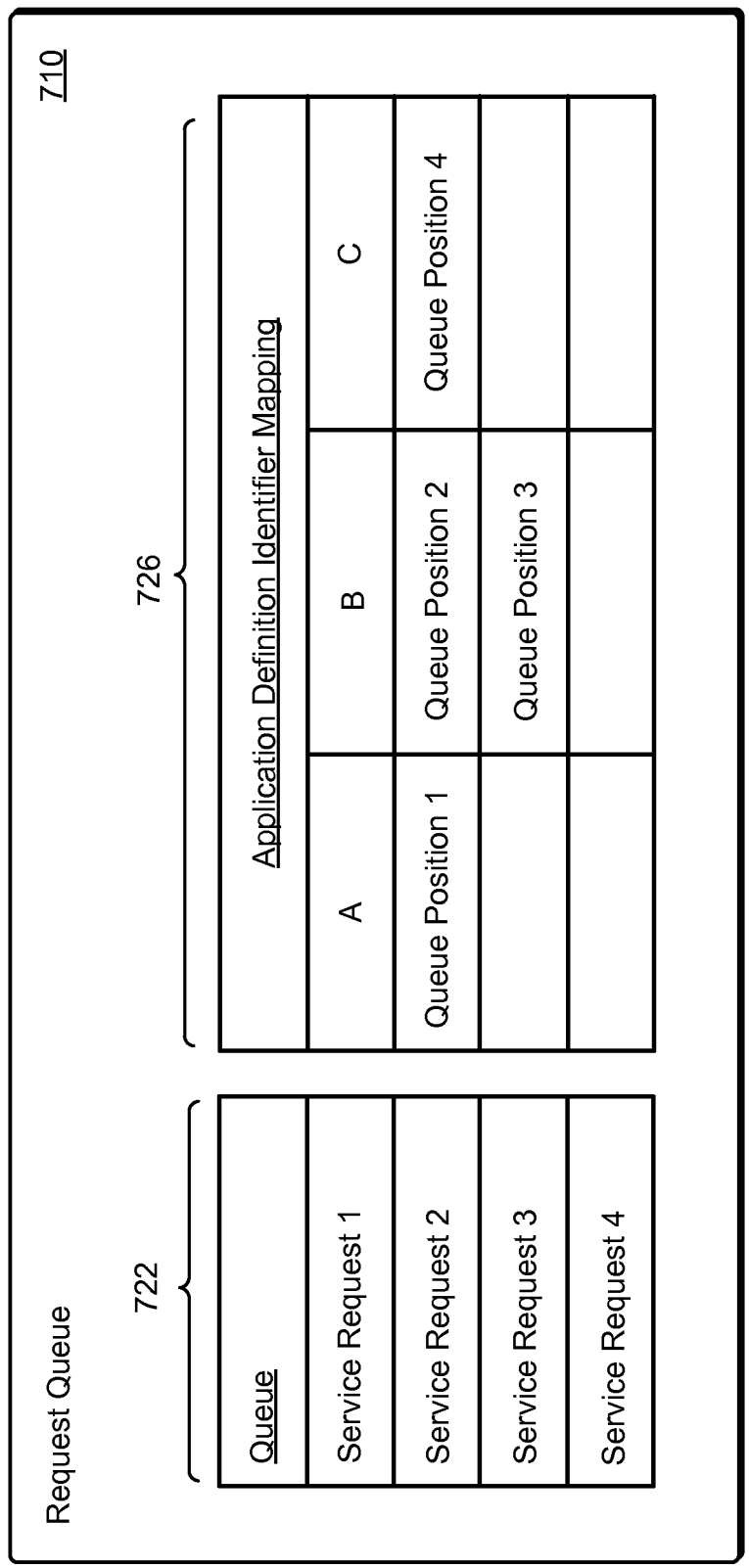
FIG. 7 shows an example of a request queue having application identifier mapping.

FIG. 7 shows an example of a request queue having application definition identifier mapping. The request queue 710 includes a queue 722 and application definition identifier mapping 726. As described herein, the queue 722 is utilized to store service requests that arrive at the request queue 710. Further, the application definition identifier mapping 726 stores, for each known application definition identifier, a queue position or an indication of the queue position where a service request needing the application definition is stored. Upon receipt of a service request, the request queue 710 may process the service request for storage in the request queue 710 and identify an application definition needed for servicing the request. The request queue 710 may then store the service request at a particular queue position in the queue 722. If the application definition identifier mapping 726 of the request queue 710 does not have an entry for the application definition identifier associated with the identified application definition, the request queue 710 may create an entry for the application definition identifier in the application definition identifier mapping 726 and indicate the queue position of the service request in the entry. If, on the other hand, the application definition identifier mapping 726 has an entry for the application definition identifier associated with the identified application definition, the request queue 710 may indicate the queue position of the service request in the entry according to its order of receipt.

Upon receipt of an availability message having a request filter that matches an application definition identifier of the application definition identifier mapping 726, the request queue 710 may identify the first queue position of the entry and provide the service request in the queue position for processing. As described herein, the service request may be de-queued or deleted from the queue 722 and the request queue position may also be de-queued or deleted from the application definition identifier mapping 726.

In an embodiment, for the application definition identifier mapping 726 may only maintain, for an application definition, a limited number of queue positions. Maintaining a limited number of queue positions is advantageous in reducing the cost of maintaining the application definition identifier mapping 726. Queue position entries for the application definition identifier mapping 726 may be added or updated periodically or accordingly to a schedule. To update the application definition identifier mapping 726, the queue 722 is scanned (from example, starting from a first queue position and ending at a second queue position) and the application definitions associated with service requests are identified. Once the application definitions are identified, the application definition identifier mapping 726 is updated to list the scanned queue positions having service requests that require a relevant application definition for processing.

It is noted that due to the limited mapping, an availability message may occasionally be received for which the application definition identifier mapping 726 does not list a satisfying queue position. The processing of the availability message may be delayed until the application definition identifier mapping 726 is updated by periodic scanning. The availability message may be processed and a service request may be provided if the periodic scanning of the request queue 722 included a service request having an associated application definition identified by the availability message.

Service requests that arrive at a request queue may be subject to blocking or may be prioritized for processing by fleet machines. A request queue may inspect a service request and may cause the service request to be block until a condition is met. Examples of service requests whose processing is subject to blocking include a service request that is part of a correlating series or a service request that includes a session identifier. For a first service request that is part of a correlating series there may be a second service request whose processing requires the first service request to be successfully processed. The processing of the second service request may be conditional upon the processing of the first service request and the second service request may be blocked until the first service request is processed. Further, when a session identifier is included in a service request, the session identifier may indicate a relationship between the processing of the service request and the processing of another service request. A service request may be blocked from processing in order to for dependencies between the service requests to be enforced.

Further, the request queue may identify a service request as being part of a correlating series based on the service request or based on the application definition required for processing the service request. A service request that does not have context may be determined to be independent of other service requests. A service request that is independent of another service request may not be required to be blocked. However, a service request that depends on another service request may be blocked pending the processing of the other service request.

A base group that is used by a fleet machine may be created by a deployment system. The base group may further be registered with a base group repository and stored in the base group repository and deployed across fleet machines and available request queues.

Figure 8:
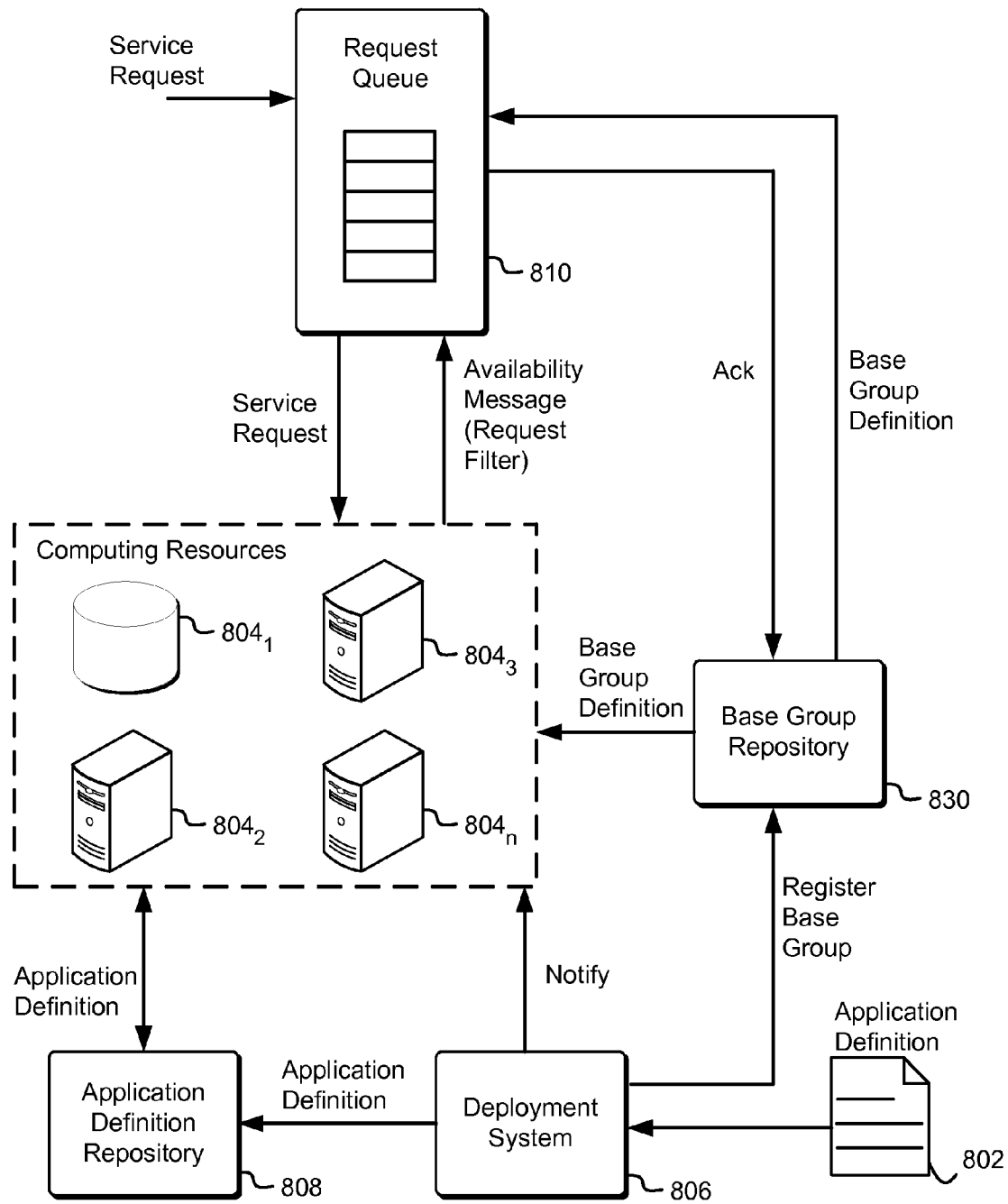
FIG. 8 shows an example of base group deployment.

FIG. 8 shows an example of base group deployment. In the figure, which includes functional entities described with reference to FIG. 4, a base group repository 830 is shown. The base group repository 830 registers and stores base group definitions. The base group repository 830 may be notified when a new base group is defined. The base group repository 830 may receive an identity associated with the base group and indication of the elements of the base group. The base group repository 830 may register the base group and populate the base group to fleet machines $804_{1-n}$.

When an application definition 802 (for example, a new application definition) is received by the deployment system 806, the deployment system 806 may create one or more base groups that specify the new application definition. As described herein, a created base group may specify and include application definition identifiers for a plurality of application definitions. If a received application definition 802 is an update over an existing application definition or a new version of the existing application definition, the deployment system 806 may update all base groups that include the existing application definition and replace the existing application definition with the new application definition in a base group definition. The deployment system 806 may change the definition of the base group to remove the existing application definition and add the received application definition.

Furthermore, if the received application definition 802 is a new application definition, the deployment system 806 may determine to add the application definition to some or all of the existing base groups or the deployment system 806 may create one or more new base groups that specify the received application definition 802 and one or more other application definitions. The deployment system 806 may then register the base group with the base group repository 830. The deployment system 806 sends a message to the base group repository 830 requesting the base group repository 830 to register the base group. The message may include an identifier associated with the base group and application definition identifiers associated with the one or more application definitions specified by the base group.

The base group repository 830 maintains a registry of all base group definitions. The base group repository 830 may, for example, include memory that stores the definitions of all base groups. The base group repository 830 then sends the base group definition to the request queue 810. The base group definition may include an identifier associated with the base group as well as application definition identifiers of the application definitions that constitute the base group. The request queue 810 receives base group definition and acknowledges receipt of the base group by sending an acknowledgement message to the base group repository 830. The request queue 810 may be configured to begin receiving service requests that require one or more of the application definitions of the base group for processing. Further, the request queue 810 may be configured to begin receiving availability messages that specify the base group. It is noted that when a plurality of request queues are used, the base group repository 830 may send the base group definition to the plurality of request queues.

The base group repository 830 then sends the base group definition to the one or more fleet machines $804_{1-n}$ associated with the request queue 810. The one or more fleet machines $804_{1-n}$ may then begin using the base group to provide a request filter to the request queue 810 and specify the application definitions that are available to the one or more fleet machines $804_{1-n}$ or to specify the resource with which the one or more fleet machines $804_{1-n}$ are configured.

An unused or outdated application definition may be similarly removed from base group definitions by the deployment system 806. To remove an application definition, the deployment system 806 may remove an application definition identifier from a base group definition or remove a base group including an outdated or unused application definition and redefine the base group as not including the unused or outdated application definition. The deployment system may also instruct the application definition repository 808 to remove the application definition.

In an embodiment, partitioning may be used for separating request queues and computing resources. For example, various request queues and computing resources may be partitioned for processing service requests that require certain application definitions as described with reference to FIG. 9.

Figure 9:
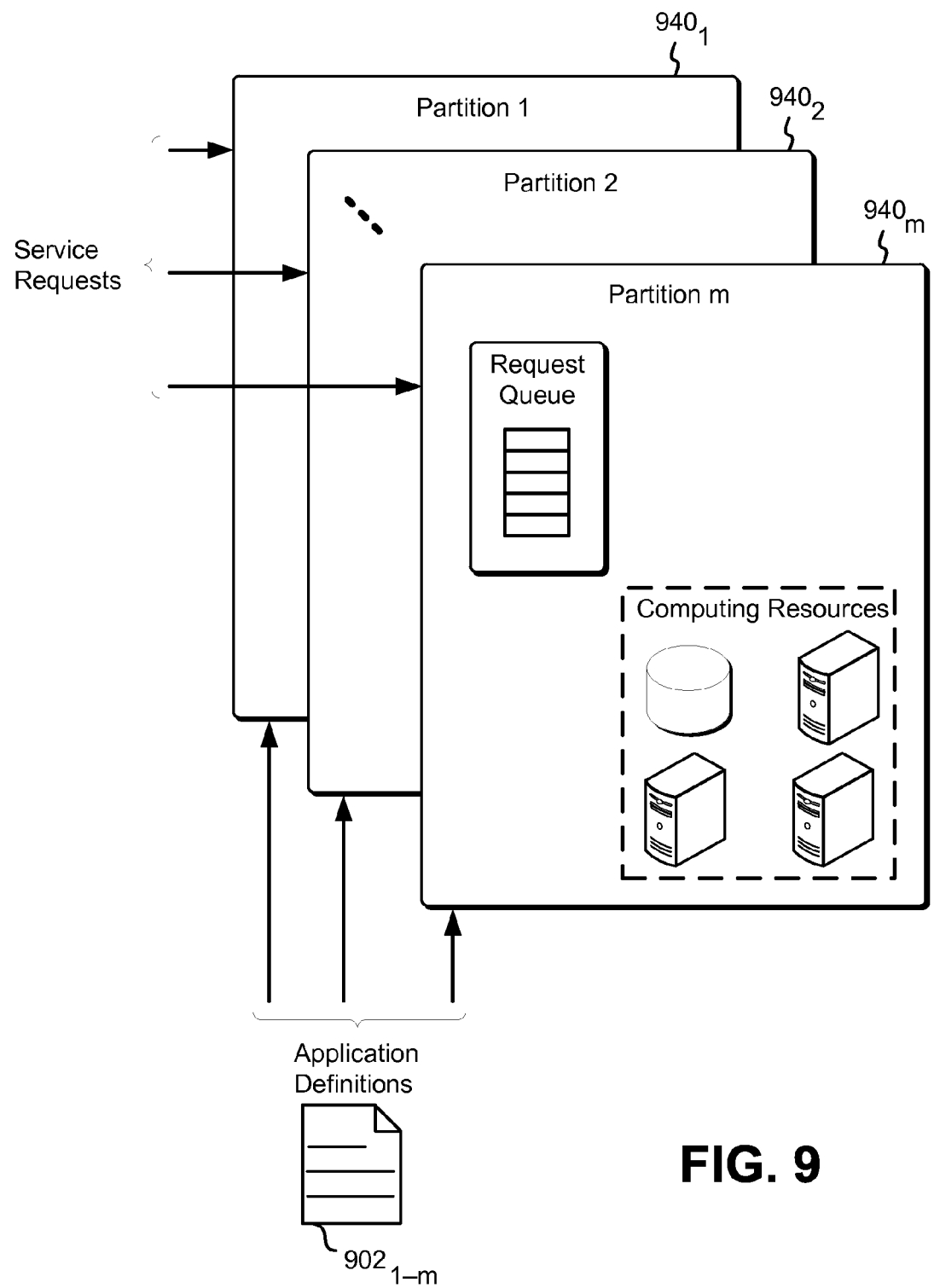
FIG. 9 shows an example of partitioning for processing service requests.

FIG. 9 shows an example of partitioning for processing service requests. Partitions $940_{1-m}$ each include a request queue and computing resources. Further, although not shown in FIG. 9, each partition 940 may also include an application definition repository, a deployment system or a base group repository as described in the environment of FIG. 8. The computing resources of each partition may be configured for processing service requests that utilize a particular set of application definitions. Each partition 940 may receive service requests independent of the other partitions. The service requests received by a partition may be serviced independent of the requests received by other partitions. Further, the application definitions that are available to a partition 940 may be different than the application definitions available to other partitions. However, in some embodiments, the application definitions available to a partition may overlap with the application definitions available to other partitions.

Partitioning is advantageous because it allows for and facilitates redundancy, whereby if a particular set of application definitions causes a failure in the partition, the failure is confined to that partition and is not populated throughout a system.

Figure 10:
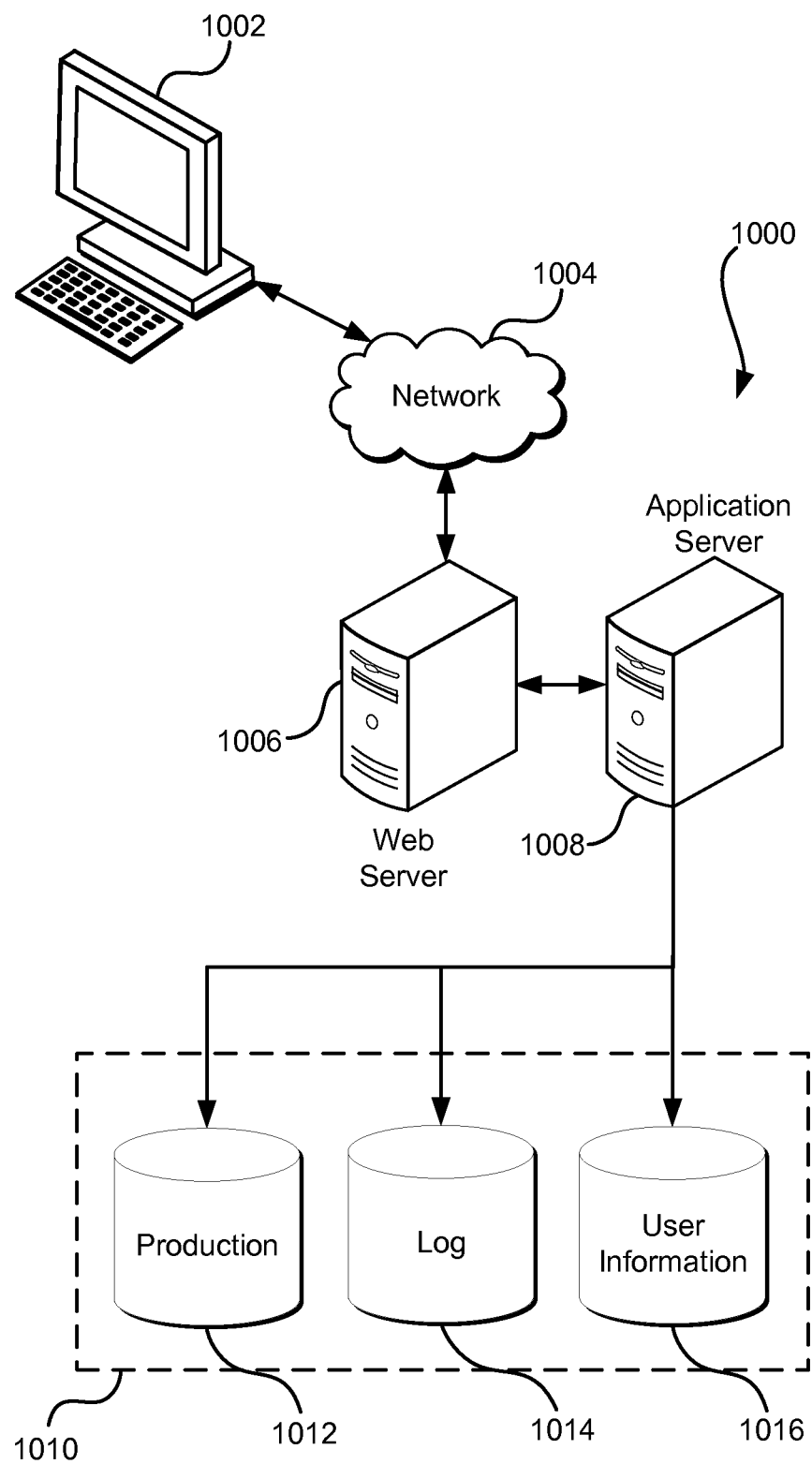
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for allocating service requests to fleet machines, comprising:
    under the control of one or more computer systems configured with executable instructions,
        receiving a plurality of service requests, each service request of at least a subset of the plurality of service requests being capable of being serviced using a corresponding application definition;
        queuing the plurality of service requests;
        receiving an availability message from a fleet machine, the availability message being associated with one or more base groups, the one or more base groups indicating a plurality of application definitions available to the fleet machine, at least a portion of the plurality of application definitions including executable application code for a computing application available to and executable by the fleet machine;
        identifying a service request of the plurality of the service requests based at least in part on the one or more base groups, wherein identifying the service request includes processing the service request to identify an application definition needed for servicing the service request, the application definition being indicated by the one or more base groups; and
        causing the identified service request to be sent to the fleet machine for processing based at least in part on the application definition being accessible to the fleet of machines.

2. The computer-implemented method of claim 1, wherein the application definition includes executable code and at least one of data or a static resource file.

3. The computer-implemented method of claim 1, wherein:
    for each base group of the one or more base groups, a base group repository stores an identity associated with the application definitions indicated by the base group; and
    identifying a service request of the plurality of the service requests includes using the base group repository to determine the application definition capable of servicing the service request is indicated by the one or more base groups.

4. The computer-implemented method of claim 1, wherein:
    the application definition is identified based at least in part on one or more of an end point address of the service request, a query parameter of the service request, information included in the service request or a protocol version indicated in the service request.

5. The computer-implemented method of claim 1, wherein:
    an application definition repository stores the application definition; and
    the fleet machine retrieves the application definition from the application definition repository.

6. The computer-implemented method of claim 1, wherein:
    metadata associated with the plurality of service requests is retained by a request queue, the metadata indicating for each service request of the plurality of service requests an application definition required for processing the service request; and
    identifying the service request of the plurality of the service requests includes determining whether the application definition required for processing the service request is the same as the application definition indicated by the one or more base groups.

7. A computer-implemented method for receiving service requests, comprising:
    under the control of one or more computer systems configured with executable instructions,
        receiving one or more base group definitions from a base group repository, the one or more base group definitions indicating, for each base group, a plurality of application definitions specified by the base group, at least a portion of the plurality of application definitions including executable application code for a computing application available to and executable by the fleet machine;
        sending an availability message to a request queue, the availability message indicating one or more application definitions corresponding to the one or more base groups;
        in response to sending the availability message, receiving a service request from the request queue, the service request being capable of being satisfied using at least one application definition of the one or more application definitions; and
        processing the received service request based at least in part on accessing the at least one application definition.

8. The computer-implemented method of claim 7, further comprising:
    processing the service request to provide an outcome; and
    sending a notification indicating successful processing of the service request, thereby causing deletion of the service request from the request queue.

9. The computer-implemented method of claim 7, further comprising:
    receiving, for each application definition of the one or more application definitions, a notification indicating an availability of the one or more application definitions in an application definition repository; and
    retrieving the application definition from the application definition repository.

10. The computer-implemented method of claim 9, wherein on a condition that a new or an updated application definition is retrieved, the availability message indicates the new or updated application definition corresponds to a base group specifying the new or updated application definition.

11. The computer-implemented method of claim 7, wherein the availability message is sent on a condition that a fleet machine has available resources or capacity to process one or more service requests.

12. The computer-implemented method of claim 7, wherein indicating one or more application definitions using the one or more base groups includes specifying one or more available application definitions using one or more logical operations performed on the one or more base groups.

13. A system configured to distribute application definitions, comprising:
- a base group repository configured to store base group definitions; and
- a plurality of fleet machines where each fleet machine is configured to:
  - receive a base group definition from the base group repository, the base group definition corresponding to a plurality of application definitions available to the fleet machine, at least a portion of the plurality of application definitions including executable application code for a computing application available to and executable by the fleet machine;
  - receive a service request from a request queue by at least providing the received base group definition to the request queue; and
  - service the received service request by at least executing an application definition from the one or more application definitions corresponding to the base group definition.

14. The system of claim 13, wherein:
- each fleet machine of the plurality of fleet machines is further configured to receive, for each application definition of the one or more application definitions, a notification indicating the application definition is available; and
- the base group definition is provided to the request queue on a condition that for each application definition of the one or more application definitions, a notification indicating the application definition is available is received.

15. The system of claim 13, wherein the base group repository is further configured to:
- receive a notification indicating an application definition is available;
- create the base group definition in response to receiving the notification, the base group corresponding to the one or more application definitions, the one or more application definitions including the application definition indicated available; and
- send the base group definition to each fleet machine of the plurality of fleet machines.

16. The system of claim 13, wherein each fleet machine is further configured to retrieve the one or more application definitions from an application definition repository prior to providing the base group definition to the request queue.

17. The system of claim 13, wherein:
- each fleet machine of the plurality of fleet machines is further configured to send a notification to a service queue indicating successful or complete servicing of the service request; and
- the service queue is configured to delete the service request upon receiving the notification.

18. The system of claim 13, wherein the service request is capable of being satisfied using the application definition from the one or more application definitions corresponding to the base group definition.

19. One or more non-transitory computer-readable storage media having collectively stored thereon instructions that, when executed by one or more processors of a system, cause the system to:
- receive a service request from a user;
- identify an application definition associated with the service request, the service request being capable of being processed by a fleet machine based at least in part on the application definition, at least a portion of the application definition including executable application code for a computing application available to and executable by the fleet machine;
- queue the service request; and
- provide the service request to the fleet machine on a condition that a request filter provided by the fleet machine indicates the application definition is available to the fleet machine.

20. The one or more non-transitory computer-readable storage media of claim 19, wherein an identity associated with the application definition is stored in metadata storage and wherein the metadata storage is searched to determine whether the identity associated with the application definition matches an application definition identity indicated by the request filter.

21. The one or more non-transitory computer-readable storage media of claim 19, wherein the service request is deleted in response to receiving a notification from the fleet machine indicating that the service request is processed.

22. The one or more non-transitory computer-readable storage media of claim 19, wherein the request filter indicates application definitions that are available to the fleet machine using one or more base groups of application definitions, and wherein each base group of the one or more base groups indicates an identity associated one or more application definitions.

23. The one or more non-transitory computer-readable storage media of claim 19, wherein the application definition includes executable code or at least one of data or a static resource file.

24. The one or more non-transitory computer-readable storage media of claim 19, wherein identifying the application definition associated with the service request is based at least in part on one or more of an end point address of the service request, a query parameter of the service request, information included in the service request or a protocol version indicated in the service request.

* * * * *